April 29, 1969     J. A. VIRAMONTES     3,441,090
GROUND SCRAPING IMPLEMENT
Filed Oct. 22, 1965     Sheet 3 of 3

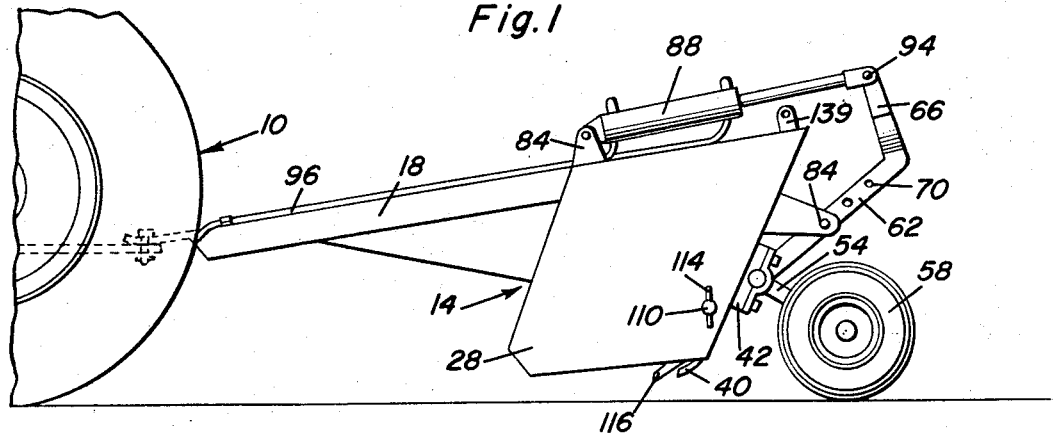
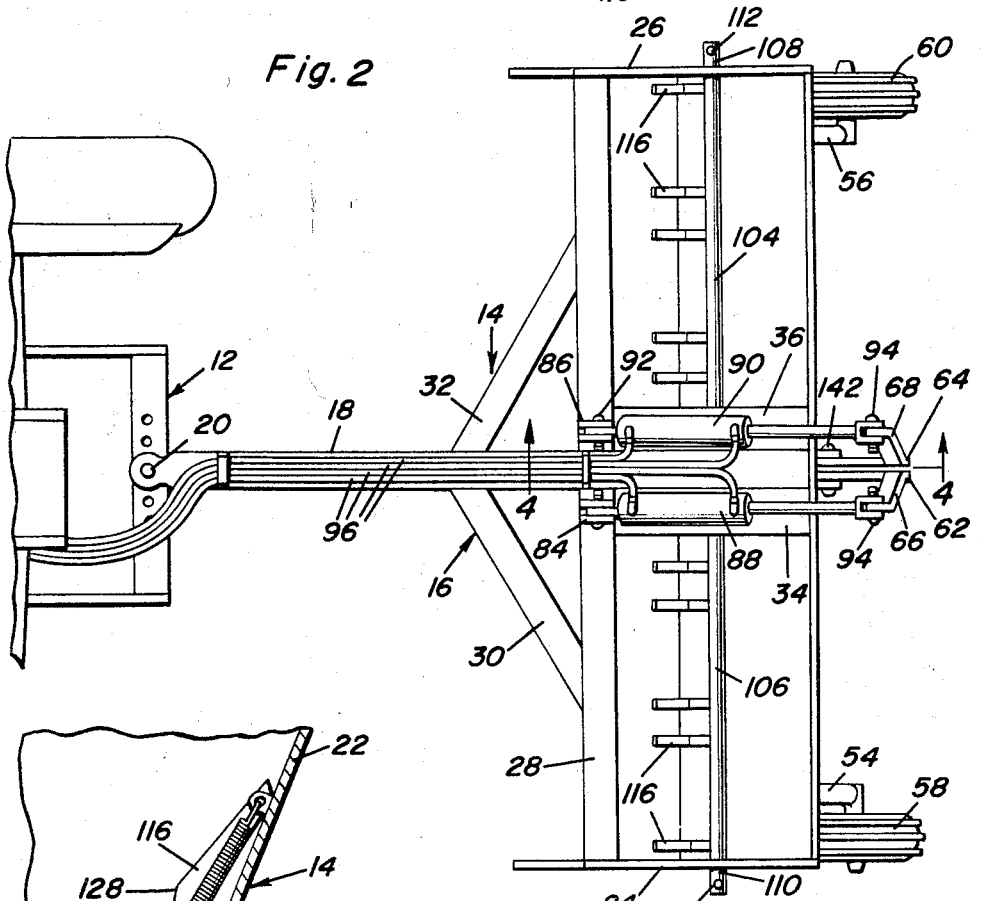
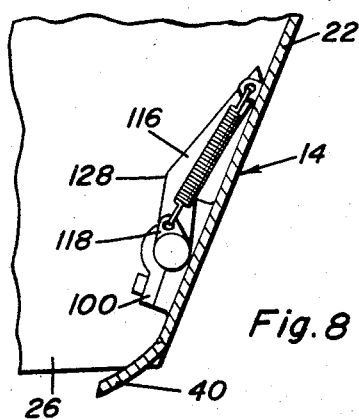

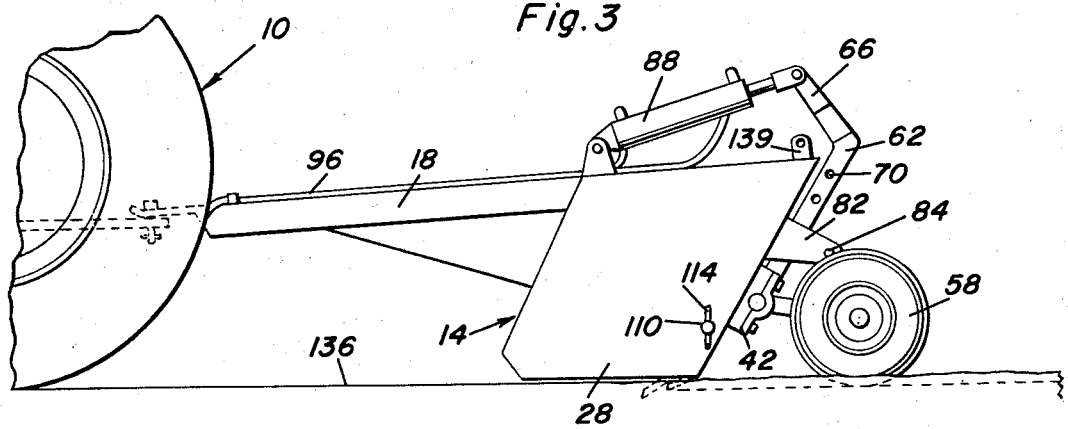
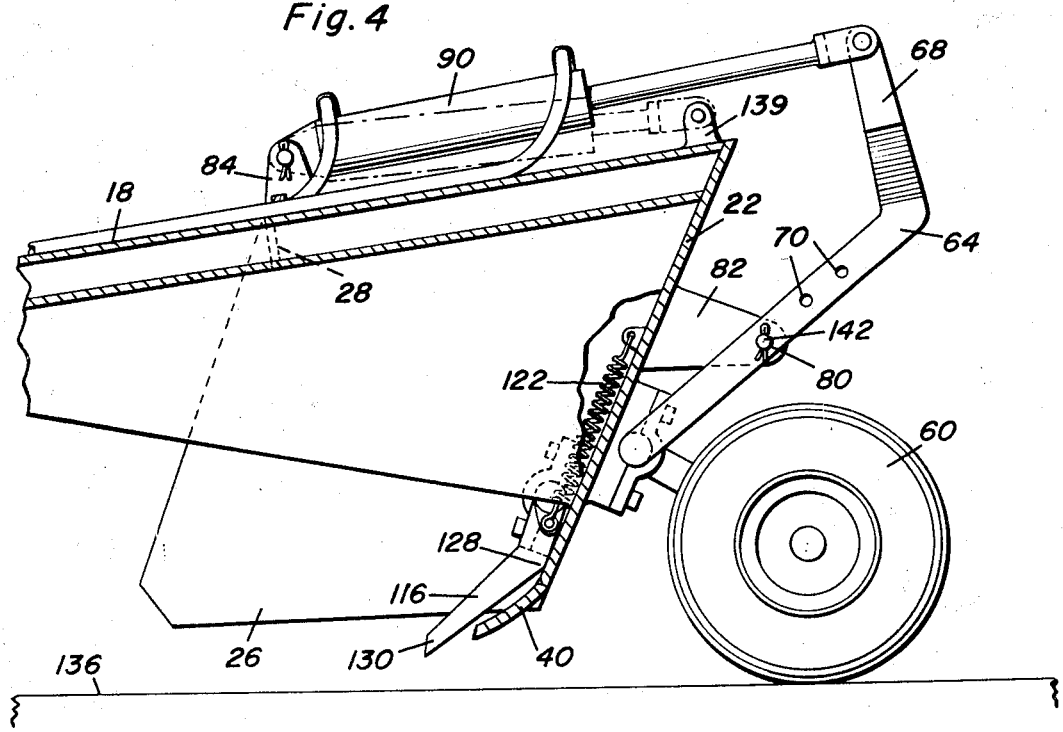

Jose A. Viramontes
INVENTOR.

United States Patent Office 3,441,090
Patented Apr. 29, 1969

3,441,090
GROUND SCRAPING IMPLEMENT
Jose A. Viramontes, Star Rte. Box 18,
Mesilla Park, N. Mex.
Filed Oct. 22, 1965, Ser. No. 500,839
Int. Cl. E02f 3/12, 3/80; A01b 63/10
U.S. Cl. 172—777          10 Claims

ABSTRACT OF THE DISCLOSURE

An earthworking vehicle including a transverse blade elevatable relative to ground-engaging support structure of the vehicle and oscillatable about a longitudinal horizontal axis. The blade includes a pair of opposite end sets of upstanding ripper teeth spaced longitudinally of the blade with each set of teeth independently shiftable between raised and lowered portions relative to the lower edge of the blade.

---

This invention relates to a novel and useful ground scraping implement and more specifically to a trailer-type of implement adapted to be drawn behind a draft vehicle such as a tractor or the like.

The ground scraping implement of the instant invention includes a support frame adapted to be advanced across ground which is to be worked and an upstanding blade is supported from the frame and includes a forwardly and downwardly inclined lower edge portion adapted to engage and penetrate the ground to be worked. The support frame includes ground engaging support means therefor and means operable to vary the height of the lower edge portion of the blade relative to the ground upon which the support means rests. In addition, the ground engaging support means of the implement are disposed on opposite sides thereof and are each independently adjustable relative to the support frame whereby the lower ground engaging edge portion of the blade may be inclined to one side or the other relative to the ground over which the implement is being drawn. Still further, the earth working blade of the ground scraping implement is provided with retractable ripper teeth which are spaced longitudinally of the blade and may be moved between operative extended positions with the ripper teeth projecting below the lower edge portion of the blade and retracted inoperative positions with the ripper teeth disposed so as to be free of projections thereof below the lower edge portion of the blade of the implement.

The ripper teeth are defined by a plurality of upstanding elongated members disposed forwardly of the blade and pivotally secured to the latter for rotation about aligned axes extending transversely of the upper ends of the elongated members and along the blade. When the teeth are in their operative positions, the free lower end portions thereof abut against the lower marginal edge portions of the blade so as to be backed by the latter and the teeth are swingable to substantially inverted positions with their free end portions abuttingly engaged with portions of the blade disposed above the axes of rotation of the ripper teeth. Still further, spring means is provided and is operatively connected between the elongated members and the blade to yieldingly urge the elongated members toward over-center extended and retracted positions, from center positions thereof with said elongated members disposed between the corresponding operative and retracted positions thereof. Further, the center positions of the elongated members are defined by positions thereof with the free ends of the elongated members still projecting slightly below the lower edge portion of the blade in order that the elongated members may be urged past the center positions by lowering the elongated members into contact with the ground and then moving the ground scraping implement in a rearward direction.

The opposite side ground engaging support wheels of the implement of the instant invention are actuated by separate motor means but may be removably interconnected for simultaneous operation by a single motor means. Further, means is provided for releasably locking the ground engaging support wheels of the ground scraping implement in predetermined adjusted positions.

The main object of this invention is to provide a ground scraping implement including an upstanding ground scraping blade supported in a manner from a support frame for independent vertical adjustment of the opposite ends of the blade relative to the ground from which the support frame is supported.

Another object of this invention is to provide a ground scraping implement in accordance with the immediately preceding object and including an improved scraper blade assembly which is inclined only slightly from the vertical throughout substantially its entire vertical height and which includes a forwardly curving ground engaging lower edge portion adapted to slice the upper layer of ground over which the implement is drawn and to curl the sliced layer of ground upwardly and forwardly in front of the scaper blade.

Still another object of this invention is to provide a ground scraping implement in accordance with the preceding objects and including readily retractable ripper teeth spaced longitudinally of the blade and which may be utilized to prepare exceedingly hard ground for removal by the lower edge portion of the scraper blade.

A final object of this invention to be specifically enumerated herein is to provide a ground scraping implement in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the ground scarping implement of the instant invention shown operatively connected to a draft vehicle;

FIGURE 2 is a top plan view of the embodiment illustrated in FIGURE 1;

FIGURE 3 is a side elevational view similar to FIGURE 1 but with the scraper blade portion of the implement being lowered into engagement with the ground;

FIGURE 4 is an enlarged fragmentary longitudinal vertical sectional view taken substantially upon the plane indicated by the section line 4—4 of FIGURE 2;

Figure 7:
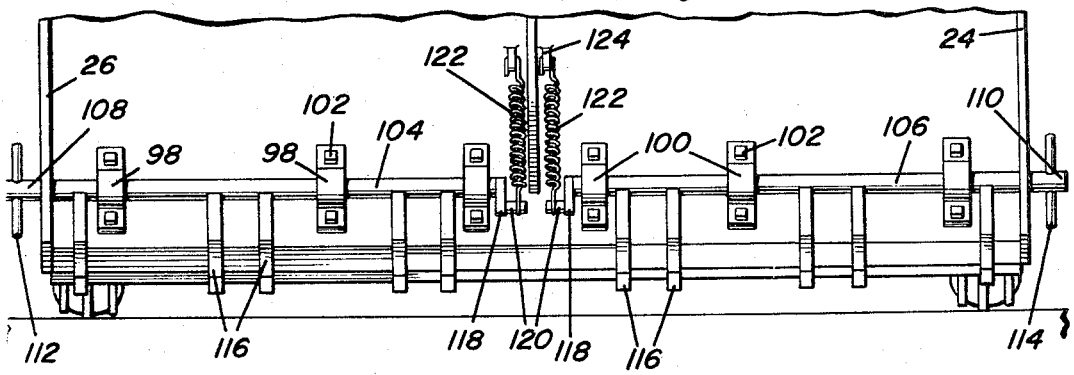

FIGURE 7 is a fragmentary front elevational view of the scraper blade portion of the implement illustrating the manner in which the ripper teeth may be positioned in extended operative positions; and FIGURE 8 is a fragmentary enlarged transverse vertical sectional view taken upon a plane passing through the lower portion of the scraper blade of the implement and illustrating the ripper teeth in retracted positions.

Referring now more specifically to the drawings the numeral 10 generally designates a tractor of any conventional design including a drawbar hitch assembly generally referred to by the reference numeral 12. The ground scraping implement of the instant invention is generally referred to by the reference numeral 14 and includes a support frame generally referred to by the reference numeral 16. The frame 16 includes a tongue portion 18 which is operatively connected to the drawbar assembly 12 in any convenient manner such as by a pivot fastener 20 and the rear end of the tongue 18 is secured in any convenient manner directly to an upstanding transversely extending blade 22. The implement 14 includes a pair of opposite sides 24 and 26 whose upstanding rear edge portions are secured to the opposite ends of the blade 22 in any convenient manner such as by welding and the forward ends of the sides 24 and 26 are rigidly interconnected by means of a transverse brace member 28 comprising a part of the main frame 16. Still further, a pair of inclined brace members 30 and 32 are secured between corresponding opposite side portions of the tongue 18 and corresponding opposite end portions of the transverse member 28. Additionally, a pair of brace members 34 and 36 disposed on opposite sides of the rear end of the tongue 18 are secured between corresponding portions of the transverse brace member 28 and the central portion of the upper marginal edge portion of the blade 22.

The blade 22 is inclined forwardly and downwardly less than 30 degrees relative to a vertical plane and includes a lower end portion projecting below the rear ends of the opposite sides 24 and 26 which curves forwardly as at 40.

The rear surface of the blade 22 has two pairs of opposite side journal blocks 42 and 44 secured thereto in any convenient manner such as by fasteners 46 and 48, respectively, and the journal blocks 42 and 44 rotetably journal a pair of aligned crankshafts 50 and 52 including crank arms 54 and 56, respectively, at their remote ends.

The free ends of the crank arms 54 and 56 have ground engaging support wheels 58 and 60, respectively, journaled therefrom.

The adjacent ends of the crankshafts 50 and 52 are provided with upstanding operating arms 62 and 64 including laterally offset upper end portions 66 and 68, respectively. The operating arms 62 and 64 are provided with corresponding pairs of registrable apertures 70 and corresponding registrable bores 80. In addition, a pair of upstanding and rearwardly projecting apertured anchor plates 82 are secured to the rear surface of the blade 22. The apertures 84 formed in the anchor plates 82 are positioned so that the bores 80 formed in the operating arms 62 and 64 are registrable therewith.

A pair of bifurcated mounts 84 and 86 are secured to the transverse brace member 28 on opposite sides of the tongue portion 18 and have pivotally supported thereform a pair of extensible fluid motors 88 and 90. The cylinder ends of the fluid motors 88 and 90 are pivotally secured to the mounts 84 and 86 by means of pivot fasteners 92. In addition, the piston rod ends of the fluid motors 88 and 90 are pivotally secured to the upper end portions 66 and 68 of the operating arms 62 and 64 by means of suitable fasteners 94. The fluid motors 88 and 90 are of the double-acting type and are provided with suitable fluid supply lines 96 operatively connecting opposite end portions of the fluid motors 88 and 90 to a suitable source of fluid under pressure (not shown) carried by the tractor 10.

The front surface of the blade 22 also has two sets of journal blocks 98 and 100 secured thereto in any convenient manner such as by fasteners 102 and the journal blocks 98 and 100 rotatably journal a pair of transversely extending operating shafts 104 and 106, respectively, which are axially spaced and aligned and include opposite end portions 108 and 110 passing through the sides 26 and 24, respectively, and provided with handle portions 112 and 114.

Each of the shafts 104 and 106 has a plurality of armlike ripper teeth 116 secured thereto for rotation therewith and also a crank arm 118. The crank arms 118 are provided with crankpin portions 120 and a pair of expansion springs 122 are secured between the crankpin portions 120 and suitable apertured anchors 124 secured to the front face of the blade 22.

As can best be seen from FIGURE 4 of the drawings the ripper teeth 116 include heel portions 128 which are engageable with the blade 22 to limit downward swinging movement of the ripper teeth 116 and toe portions 130 which engage the front surface of the blade 22 and limit upward swinging movement of the ripper teeth 116. The crankpins 120 are so positioned that when the ripper teeth 116 are in the position illustrated in FIGURE 4 of the drawings they are in an over-center position enabling the expansion springs 122 to yieldingly retain the ripper teeth 116 in their extended operative positions. In addition, the expansion springs 122 also serve to retain the ripper teeth 116 in raised and retracted inoperative positions such as that illustrated in FIGURE 8 of the drawings. The center position of the ripper teeth 116 is a position with the lower end portions of the ripper teeth 116 illustrated in FIGURE 4 of the drawings swung only slightly to the left and accordingly it may be seen that by lowering the blade 22 into engagement with the ground and moving the ground scraping element 14 rearwardly the ripper teeth 116 may be caused to pivot past their center positions and thus enable the spirngs 122 to swing the ripper teeth 116 to their retracted positions illustrated in FIGURE 8 of the drawings.

In operation, the fluid motors 88 and 90 may be retracted fully to lower the blade 22 into engagement with the ground 136. In this position of adjustment of the blade 22, the ripper teeth 116 may either be extended or retracted as desired.

Figure 5:
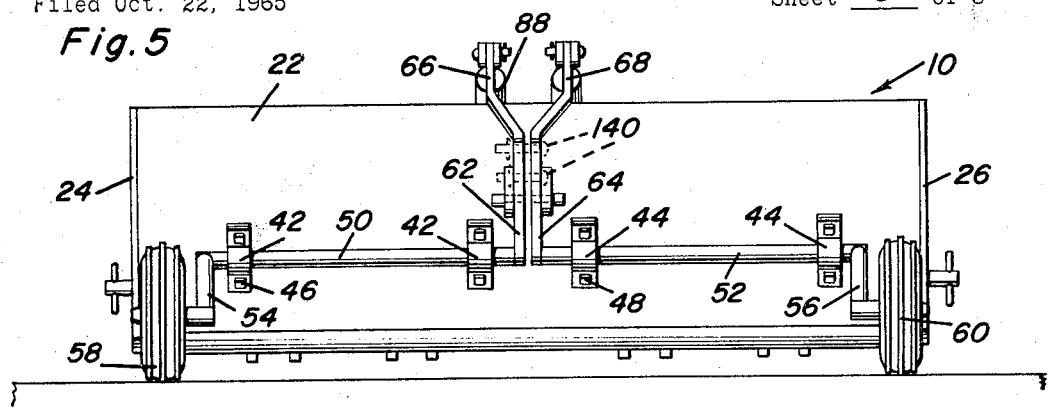
FIGURES 5 and 6 are rear elevational views of the ground scraping implement illustrating the manner in which the scraping blade thereof may be adjustably inclined.
Figure 6:
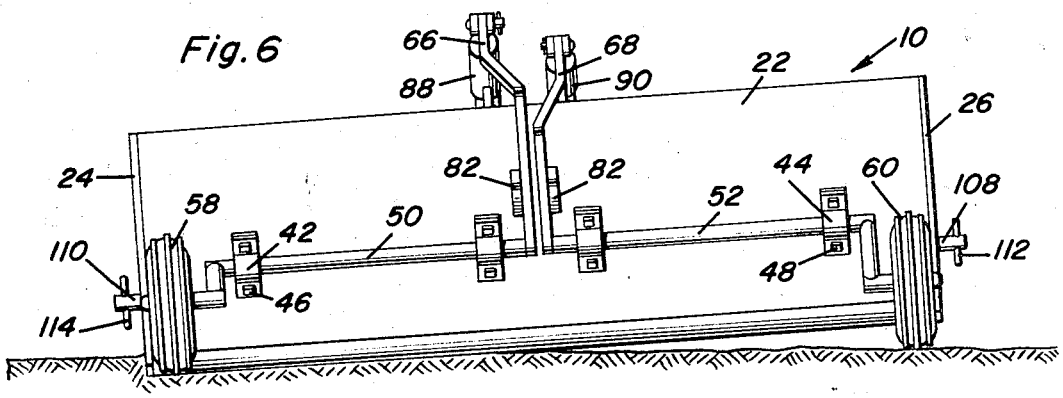

By varying the amount the fluid motors 88 and 90 are extended the blade 22 may be caused to be transversely inclined as illustrated in FIGURE 6 of the drawings. However, if it is desired to maintain the blade 22 substantially horizontally disposed in a transverse direction the fluid motors 88 and 90 may be equally extended or retracted. Still further, should one of the fluid motors be rendered inoperative, it may be disconnected from its corresponding operating arm and secured to a corresponding apertured anchor 139 carried by the corresponding brace member extending between the transverse brace member 28 and the blade 22. Then, the operating arms 62 and 64 may be secured together by means of removable fasteners 140 illustrated in phantom lines in FIGURE 5 of the drawings for like swinging movement of the arms 62 and 64 by the one fluid motor remaining operative. Thus, both operating arms 62 and 64 may be operated by a single fluid motor.

From FIGURE 4 of the drawings it may be seen that the apertures formed in the plate 82 may be registered with the bores 80 and that a suitable pin 142 may be secured through the apertured plates 82 and the bores 80 in order to secure the operating arms 62 and 64 in one position of adjustment with the blade 22 raised above the surface of the ground 136 for transport of the ground scraping implement 14. Of course, locking the operating arms 62 and 64 in the position illustrated in FIGURE 4 of the drawings by means of the pin or fastener 142 removes any operating forces from the fluid motors 88 and 90.

The foregoing is considered as illustrative only of the principles of the invention. Further, since numerous modifications and changes will readily occur to those skilled in the art, it is not desired to limit the invention to the exact construction and operation shown and described.

What is claimed as new is as follows:

1. A ground scraping implement comprising a support frame defining a longitudinal centerline and adapted to be advanced across ground which is to be worked, an upstanding transversely extending blade supported from said frame and including a forwardly and downwardly inclined lower edge portion adapted to engage and penetrate said ground, said implement including ground engaging support means therefor and means operable to vary the height of said lower edge portion relative to the ground upon which said support means rest, a plurality of retractable ripper teeth secured to said blade at points spaced longitudinally therealong and movable between a retracted position free of portions thereof projecting below the lower edge portion of said blade and extended positions with portions projecting below and braced by said lower edge portion, said ripper teeth defining upstanding elongated members, means pivotally securing the upper ends of said elongated members to said blade for rotation about axes spaced above the lower edge portion of said blade and with said elongated members disposed in front of said blade and their lower ends projecting below said lower edge portion when in the extended positions and abutting against said lower edge portion of said blade so as to be backed thereby, said elongated members being pivotable about said axes into substantially inverted retracted positions with the free ends thereof abutted against said blade above said axes, over center spring means operatively connected between said elongated members and said blade operative to yieldably urge said elongated members toward said extended and retracted positions from positions rotated slightly toward said operative and retracted positions, respectively, from over center positions of said elongated members disposed between the corresponding operative and retracted positions.

2. The combination of claim 1 wherein at least some of said elongated members are interconnected for simultaneous swinging movement relative to said blade.

3. The combination of claim 1 including a pair of opposite side crank arms pivotally supported, at one pair of corresponding end portions, from said frame for independent rotation about axes extending transversely of said frame, said ground engaging support means being carried by the other pair of corresponding end portions of said crank arms and adapted to engage said ground and adjustably support at least the portion from which said blade is supported for vertical adjustment relative to said ground, said means operative to vary the height of said lower edge portion including means operatively connected between said frame and said crank arms operable to independently adjustably rotate said arm relative to said frame to thereby adjust the vertical positioning of the lower edge portion of said blade relative to the ground.

4. The combination of claim 3 wherein said crank arms are carried by a pair of transversely extending crankshafts journaled for rotation about axes extending transversely of said frame.

5. The combination of claim 4 wherein said shafts are disposed rearwardly of and journaled from said blade.

6. The combination of claim 5 wherein said shafts are substantially aligned and said arms are carried by the remote end portions of said shafts.

7. The combination of claim 6 wherein the adjacent end portions of said shafts include operator arms projecting upwardly therefrom behind said blade, said means operatively connected between said frame and said crank arms comprising extendible fluid motors pivotally secured at their opposite end portions to said frame and the upper ends of said operator arms.

8. The combination of claim 7 wherein said fluid motors are removably pivotally secured to said operator arms and said motors and said frame include means operative to selectively removably secure the portions of said fluid motors secured to said operator arms to said frame, and means carried by said operator arms and said blade operative to releasably secure said operator arms in predetermined pivoted positions relative to said blade.

9. The combination of claim 3 wherein at least a substantial majority of the upper portion of said blade is inclined rearward and upward relative to the vertical less than 30° and the lower marginal edge portion of said blade curves forwardly and terminates in a terminal free edge portion inclined less than 30° relative to the horizontal.

10. A ground scraping implement comprising a support frame defining a longitudinal centerline and adapted to be advanced across ground which is to be worked, an upstanding transverse extending blade supported from said frame and including a forwardly and downwardly inclined lower edge portion adapted to engage an penetrate said ground, a pair of opposite side crank arms pivotally supported, at one pair of corresponding end portions from said frame for independent rotation about axes extending transversely of said frame, ground engaging support means carried by the other pair of corresponding end portions of said crank arms and adapted to engage said ground and adjustably support at least the portion of said frame from which said blade is supported for vertical adjustment relative to said ground, and means operatively connected between said frame and said crank arms operable to independently adjustably rotate said arms relative to said frame to thereby adjust the vertical positioning of the lower edge portion of said blade relative to the ground, said crank arms being carried by a pair of transversely extending crankshafts journaled for rotation about axes extending transversely of said frame, said shafts being substantially aligned and said arms being carried by the remote end portions of said shafts, the adjacent end portions of said shafts including operator arms projecting upwardly therefrom behind said blade, said means operatively connected between said frame and said crank arms comprising extendible fluid motors pivotally secured at their opposite end portions to said frame and the free ends of said opertaor arms, said operator arms including means adapted to removably secure said operation arms together for equal and simultaneous swinging movement, at least one of said fluid motors being removably secured to the corresponding operator arm.

References Cited

UNITED STATES PATENTS

| 1,811,811 | 6/1931  | Thornton       | 37—165 |
| 1,982,219 | 11/1934 | McAlister      | 37—168 |
| 2,262,415 | 11/1941 | Williams et al. |        |
| 3,032,902 | 5/1962  | Shumaker       | 37—180 |

ABRAHAM G. STONE, *Primary Examiner.*

S. C. PELLEGRINO, *Assistant Examiner.*

U.S. Cl. X.R.

172—494